United States Patent
Graham et al.

(10) Patent No.: US 10,563,494 B2
(45) Date of Patent: Feb. 18, 2020

(54) METHOD OF REMANUFACTURING FLUID END BLOCK

(71) Applicant: Caterpillar Inc., Peoria, IL (US)

(72) Inventors: Curtis J. Graham, Peoria, IL (US); Christopher A. Kinney, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 15/801,422

(22) Filed: Nov. 2, 2017

(65) Prior Publication Data
US 2019/0128104 A1 May 2, 2019

(51) Int. Cl.
| | | |
|---|---|---|
| *E21B 43/267* | (2006.01) | |
| *B23P 6/04* | (2006.01) | |
| *F04B 47/04* | (2006.01) | |
| *F04B 7/04* | (2006.01) | |
| *F04B 53/10* | (2006.01) | |
| *B23K 10/00* | (2006.01) | |
| *F04B 37/12* | (2006.01) | |

(52) U.S. Cl.
CPC .............. *E21B 43/267* (2013.01); *B23P 6/04* (2013.01); *F04B 7/04* (2013.01); *F04B 47/04* (2013.01); *F04B 53/10* (2013.01); *B23K 10/00* (2013.01); *F04B 37/12* (2013.01)

(58) Field of Classification Search
CPC .......... E21B 43/267; F04B 47/04; F04B 7/04; F04B 53/10; B23P 6/04; B23K 10/00
See application file for complete search history.

(56) References Cited

U.S. PATENT DOCUMENTS

| | | |
|---|---|---|
| 8,465,268 B2 | 6/2013 | Baxter et al. |
| 8,874,383 B2 | 10/2014 | Gambier et al. |
| 9,121,402 B2 | 9/2015 | Marshall et al. |
| 9,188,123 B2 | 11/2015 | Hubenschmidt et al. |
| 9,243,630 B2 | 1/2016 | Foote |
| 9,528,508 B2 | 12/2016 | Thomeer et al. |
| 2013/0195701 A1* | 8/2013 | Skurdalsvold ............ F04B 1/00 417/521 |

FOREIGN PATENT DOCUMENTS

GB 2538036 11/2016

* cited by examiner

*Primary Examiner* — Moshe Wilensky
(74) *Attorney, Agent, or Firm* — Jonathan F. Yates

(57) ABSTRACT

A method of remanufacturing a fluid end block having a plurality of segments adapted to receive working fluid includes removing at least one damaged segment from the plurality of segments of the fluid end block. The method also includes providing at least one replacement segment at a location of the at least one damaged segment. The method further includes providing a seal between a first surface of the at least one replacement segment and a first surface of at least one adjacent segment of the plurality of segments. The method includes coupling the at least one replacement segment with the at least one adjacent segment to form a remanufactured fluid end block.

5 Claims, 8 Drawing Sheets

METHOD OF REMANUFACTURING FLUID END BLOCK

TECHNICAL FIELD

The present disclosure relates to a fluid end block, and more particularly to a method of remanufacturing the fluid end block.

BACKGROUND

Industries, such as oil and gas industries, implement pump assemblies for performing high pressure pumping operations including, but not limited to, exploration of wellbore, cementing of wellbore, and extraction of hydrocarbons. The pump assemblies include a fluid end block. Typically, working fluid is drawn in via a suction valve and introduced in the fluid end block. The working fluid is pressurized and subsequently discharged under high pressure for performing the aforementioned operations.

The fluid end block is generally subjected to high pressures, which are cyclic in nature. The high pressure operations often make the fluid end block susceptible to damages in the form of erosion, wear and tear, and fatigue. Such damages can result in formation of cracks in the fluid end block and require the pump operation to be shut down. Generally, a repair of the fluid end block requires replacement of the entire fluid end block, which increases cost associated with maintenance of the pump assemblies.

U.S. Pat. No. 9,243,630 describes a segmented fluid end for high-pressure plunger pumps. One segmented fluid end includes one or more fluid end modules, each fluid end module including a body providing a plunger bore configured to receive a plunger therein and a discharge outlet in fluid communication with the plunger bore. A pressurized working fluid may exit the body of each fluid end module via the discharge outlet. The segmented fluid end includes a discharge manifold having an elongate manifold body configured to be operatively coupled to each fluid end module. The manifold body includes a first end, a second end, a discharge bore extending between the first and second ends, and one or more discharge inlets that fluidly communicate with the discharge bore. The segmented fluid end further includes ring joint gasket arranged between each discharge inlet of the discharge manifold and a corresponding discharge outlet of the one or more fluid end modules.

SUMMARY OF THE DISCLOSURE

In one aspect of the present disclosure, a method of remanufacturing a fluid end block is provided. The fluid end block includes a plurality of segments adapted to receive working fluid. The method includes removing at least one damaged segment from the plurality of segments of the fluid end block. The method also includes providing at least one replacement segment at a location of the at least one damaged segment. The method further includes providing a seal between a first surface of the at least one replacement segment and a first surface of at least one adjacent segment of the plurality of segments. The method includes coupling the at least one replacement segment with the at least one adjacent segment to form a remanufactured fluid end block.

In another aspect of the present disclosure, a remanufactured fluid end block is provided. The remanufactured fluid end block includes a plurality of segments for receiving working fluid. The plurality of segments include at least one replacement segment that replaces at least one damaged segment of the plurality of segments. The at least one replacement segment is coupled to at least one adjacent segment of the plurality of segments. The remanufactured fluid end block also includes a seal disposed between the at least one replacement segment and the at least one adjacent segment.

In yet another aspect of the present disclosure, a pump assembly is provided. The pump assembly includes a power end, a suction manifold adapted to introduce working fluid in the pump assembly, and a discharge manifold adapted to discharge the working fluid from the pump assembly. The pump assembly also includes a remanufactured fluid end block in fluid communication with the suction manifold and the discharge manifold. The remanufactured fluid end block includes a plurality of segments for receiving the working fluid. The plurality of segments includes at least one replacement segment that replaces at least one damaged segment of the plurality of segments. The at least one replacement segment is coupled to the at least one adjacent segment of the plurality of segments. The remanufactured fluid end block also includes a seal disposed between the at least one replacement segment and the at least one adjacent segment.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
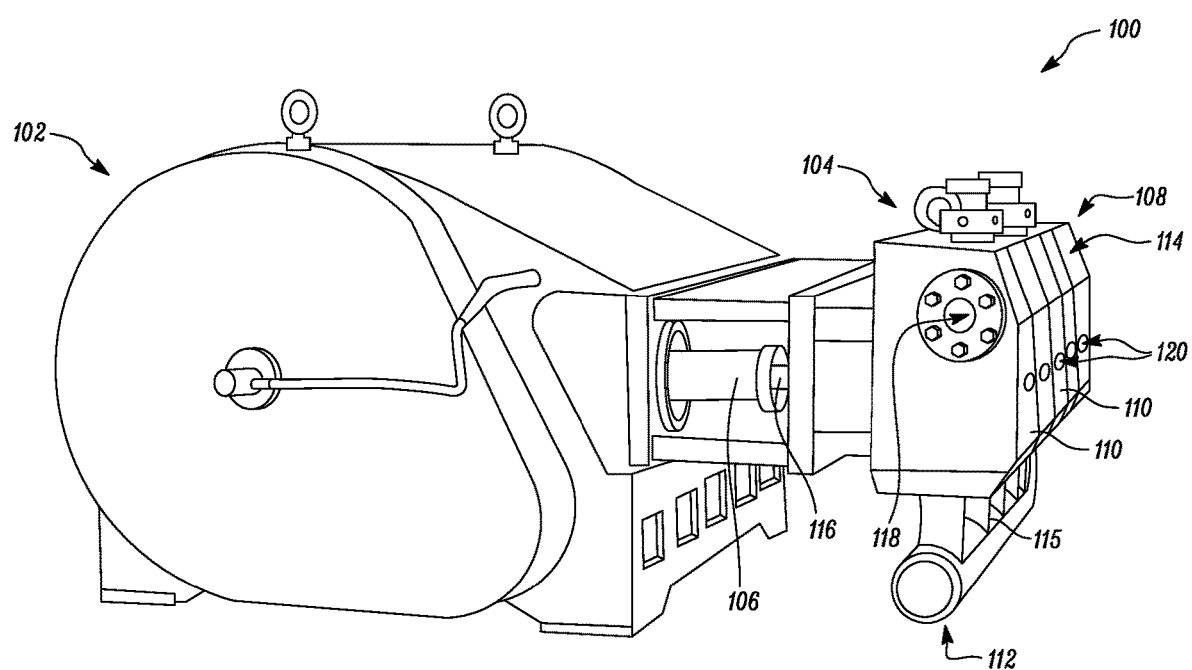
FIG. 1 is a perspective view of an exemplary pump assembly.

FIG. 1 is a perspective view of an exemplary pump assembly 100. The pump assembly 100 may be associated with industries, such as oil and gas industries or cement manufacturing and processing industries, without any limitations. In one example, the pump assembly 100 can be used for high pressure applications. For example, the pump assembly 100 can embody a well stimulation pump that can be used in operations such as horizontal fluid fracturing, chemical injection, acidizing, and the like. However, it should be noted that the pump assembly 100 can be used in any other application, without limiting the scope of the present disclosure.

The pump assembly 100 includes a power end 102 and a fluid end 104 operatively coupled to the power end 102. In the illustrated example, the pump assembly 100 is embodied as a reciprocating pump or a plunger pump. The power end 102 includes a power train (not shown). The power train may include various components (not shown), such as an engine, a transmission unit, and a drive shaft. The power train powers a set of crank shafts that are operatively coupled to the power train. The crank shafts are drivably connected to a set of connecting rods 106 and gears (not shown). The set of connecting rods 106 form a part of a crosshead assembly (not shown) that is operatively coupled to the fluid end 104 to stimulate a flow of working fluid. It may be noted that the working fluid may be a water based mixture that includes, but not limited to, sand, polymers, and biocides. The working fluid may vary based on a type of application of the pump assembly 100.

The fluid end 104 includes a fluid end block 108. The fluid end block 108 may enclose or support components of the fluid end 104. In one embodiment, a material of the fluid end block 108 may be high carbon steel having an increased strength, without limiting the scope of the present disclosure. The fluid end block 108 includes a number of segments 110 arranged adjacent to each other. The fluid end block 108 may include any number of segments based on a power requirement of the pump assembly 100. The fluid end block 108 illustrated herein includes five segments 110. The fluid end. 104 also includes a suction manifold 112 that introduces the working fluid into each of the segments 110. Further, the fluid end 104 includes a discharge manifold 114 fluidly coupled to each of the segments 110 of the fluid end block 108.

Each segment 110 of the fluid end block 108 further includes a plunger 116, a compression area 111 (shown in FIG. 2), a discharge valve assembly (not shown), a discharge conduit 118, a suction valve assembly (not shown), and a relief valve assembly 120. Further, the power end 102 drives the plunger 116 of each of the segments 110. The plunger 116 may be actuated to reciprocate within the compression area 111. More particularly, the crosshead assembly of the power end 102 is clamped to the plunger 116 using clamps. The compression area 111 may be in fluid communication with the discharge valve assembly, the discharge conduit 118, the suction valve assembly, and the relief valve assembly 120.

During an operation of the pump assembly 100, the working fluid enters the fluid end 104 via the suction manifold 112. The suction manifold 112 includes a number of suction conduits 115 for directing the working fluid to each of the segments 110 of the fluid end block 108. Further, a reciprocating motion of the plunger 116 pressurizes the working fluid introduced in the compression area 111 of the respective segments 110. The high pressure working fluid exits the pump assembly 100 via the discharge conduit 118 and is collected at the discharge manifold 114.

Figure 2:
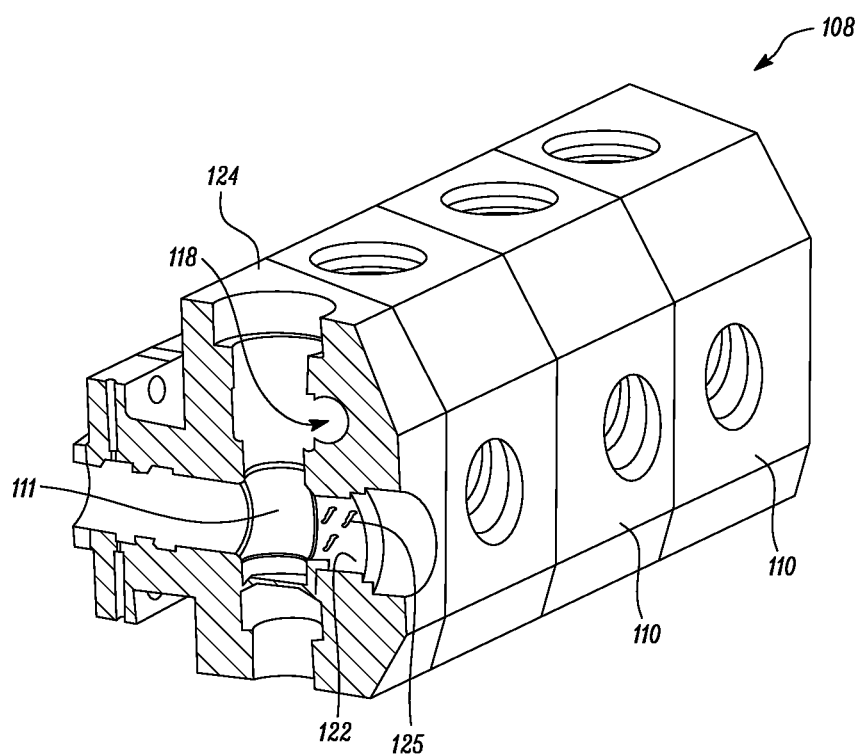
FIG. 2 is a perspective view of a fluid end block of the pump assembly of FIG. 1 having a damaged segment.

FIG. 2 is a perspective view of the fluid end block 108. As mentioned earlier, the fluid end block 108 includes the number of segments 110. The working fluid is pressurized at the compression area III of each of the segments 110. More particularly, an inner surface 122 of each of the segments 110 are subjected to high pressures ranging between 10,000 PSI and 20,000 PSI. The high pressure creates a fatigue stress in the compression area 111, the suction conduit 115 (see FIG. 1), and the discharge conduit 118 (see FIG. 1). The fatigue stress may damage one or more segments 110 of the fluid end block 108. For example, a damaged segment 124 may be formed in the fluid end block 108 due to formation of one or more cracks 125. The cracks 125 may be formed at the inner surface 122 and may extend up to a certain depth of the damaged segment 124.

The damaged segment 124 may be repaired in what may be referred to as a remanufacturing process. During the remanufacturing process, the damaged segment 124 is removed from the fluid end block 108. In one embodiment, the damaged segment 124 may be located at one of a first end 134 and a second end 136 of the fluid end block 108. The damaged segment 124 may be removed using metal cutting methods including, but not limited to, plasma cutting, laser cutting, and mechanical cutting using saw and shear. As used herein, "remanufacturing" may refer broadly to the remanufacture, repair, or other similar process associated with the fluid end block 108.

Figure 3:
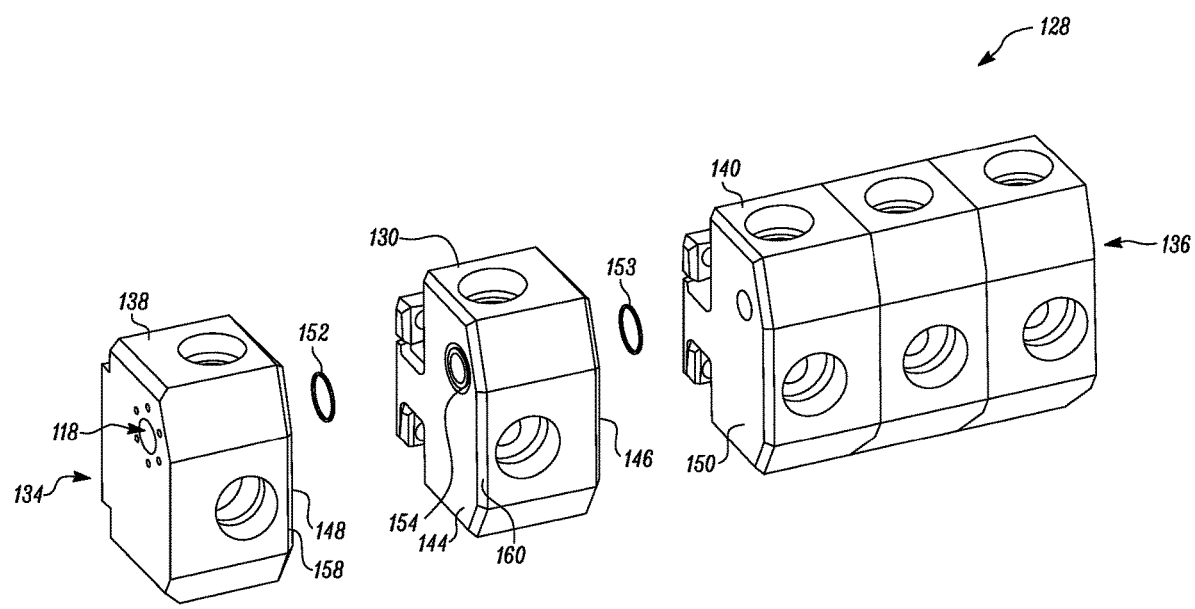
FIG. 3 is an exploded view of a remanufactured fluid end block having a replacement segment, according to one embodiment of the present disclosure.

FIG. 3 is an exploded view of a remanufactured fluid end block 128 having a replacement segment 130, according to one embodiment of the present disclosure. The replacement segment 130 replaces the damaged segment 124 (see FIG. 2). The replacement segment 130 is provided at a location of the damaged segment 124. It should be noted that a location of the replacement segment 130 may vary based on the location of the damaged segment 124. Accordingly, the replacement segment 130 may be coupled to a single adjacent segment 110 (see FIG. 2) or the replacement segment 130 may be positioned in between two adjacent segments 110. In another example, the replacement segment 130 may be located at a central portion of the remanufactured fluid end block 128. In the illustrated embodiment, the replacement segment 130 is coupled to a first adjacent segment 138 and a second adjacent segment 140 that are positioned at either sides of the damaged segment 124.

It may be noted that the replacement segment 130 may be pre-made based on a type of the pump assembly 100. It may be contemplated that the replacement segment 130 is identical in design, dimensions, and material to the damaged segment 124 of the fluid end block 108. In one embodiment, a material of the replacement segment 124 is same as that of the material of the fluid end block 108. In another embodiment, the material of the replacement segment 124 may be different from the material of the fluid end block 108.

The replacement segment 130 includes a first surface 144 and a second surface 146 opposite to the first surface 144. When the replacement segment 130 is coupled with the first adjacent segment 138, the first surface 144 of the replacement segment 130 is disposed adjacent to a first surface 148 of the first adjacent segment 138. When the replacement segment 130 is coupled with the second adjacent segment 140, the second surface 146 of the replacement segment 130 is disposed adjacent to a first surface 150 of the second adjacent segment 140. The first surfaces 148, 150 of the first and second adjacent segments 138, 140 are machined to accommodate the replacement segment 130 upon the removal of the damaged segment 124 from the fluid end block 108 using a known machining process.

Further, the replacement segment 130 is coupled with the first and second adjacent segments 138, 140. For exemplary purposes, the present disclosure will now be explained in relation to the coupling of the replacement segment 130 with the first adjacent segment 138. However, it should be noted that the details provided below are equally applicable to the coupling of the replacement segment 130 with the second adjacent segment 140. It should be further noted that the details of the coupling provided below is equally applicable to coupling of any replacement segment with any adjacent segment of the fluid end block 108, without any limitations.

The remanufactured fluid end block 128 includes a seal 152 disposed between the replacement segment 130 and the first adjacent segment 138. More particularly, the seal 152 is disposed between the first surface 144 of the replacement segment 130 and the first surface 148 of the first adjacent segment 138. The replacement segment 130 includes a circular groove 154 formed on the first surface 144 of the replacement segment 130. The circular groove 154 is adapted to receive the seal 152.

In one embodiment, the seal 152 is a metal seal having an O-ring shape or a C-ring shape. More particularly, the seal 152 may be a spring energized metal seal including an outer layer and a spring received within the outer layer. The spring energized metal seal provides a specific resistance to a change in pressure occurring at the compression area 111 (see FIG. 2) of the remanufactured fluid end block 128, during the operation of the pump assembly 100. Further, the seal 152 fills any machining imperfections of the first surface 148 of the first adjacent segment 138 by establishing a positive contact thereby. It should be noted that a similar seal 153 is disposed between the second surface 146 of the replacement segment 130 and the first surface 150 of the second adjacent segment 140.

In the illustrated embodiment, the replacement segment 130 is coupled to the first adjacent segment 138 by welding. The coupling of the replacement segment 130 and the first adjacent segment 138 using welding will now be explained with reference to FIGS. 3 to 5.

Referring to FIG. 3, in order to couple the replacement segment 130 with the first adjacent segment 138, the first surface 148 of the first adjacent segment 138 is machined to provide a first chamfered edge 158. Further, the first surface 144 of the replacement segment 130 is also machined to provide a second chamfered edge 160.

Figure 4:
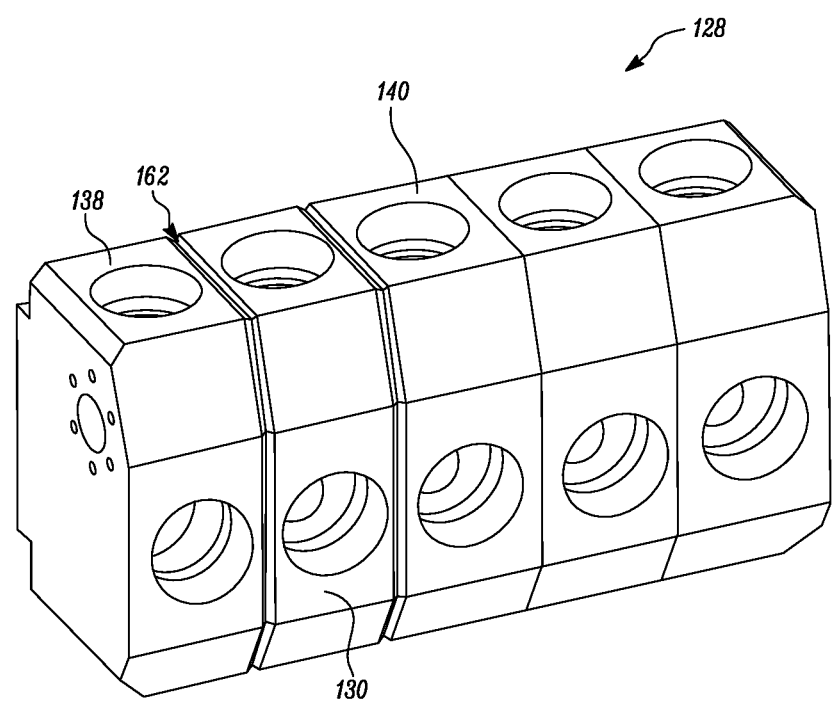
FIG. 4 is a perspective view of the remanufactured fluid end block having the replacement segment.
Figure 5:
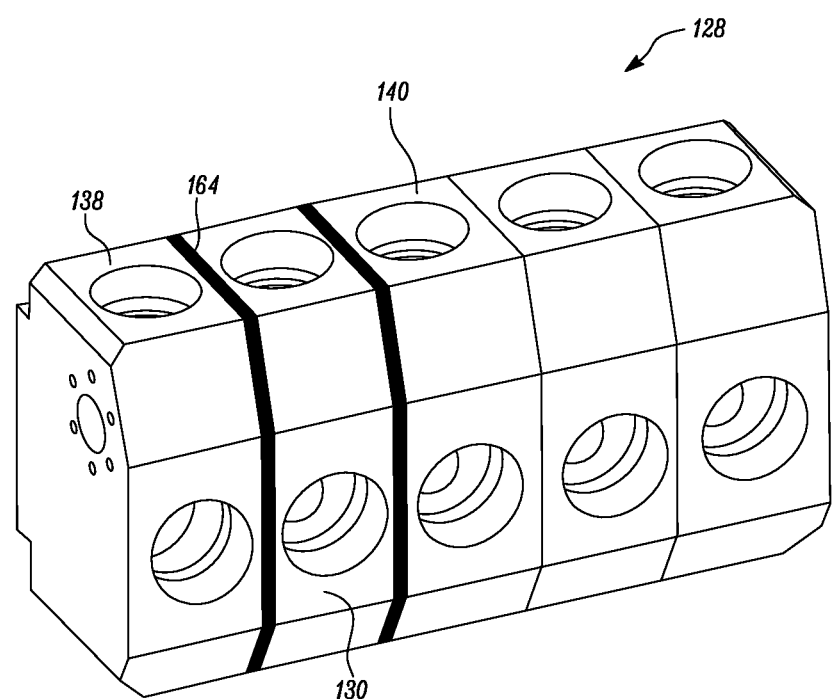
FIG. 5 is a perspective view of the remanufactured fluid end block formed by welding.

Referring now to FIG. 4, as the replacement segment 130 is disposed adjacent to the first adjacent segment 138, a channel 162 is formed by the first and second chamfered edges 158, 160 (see FIG. 3). The channel 162 is embodied as a V-shaped channel. As shown in FIG. 5, a weld bead 164 is provided in the channel 162 for coupling the replacement segment 130 with the first adjacent segment 138. It should be noted that any welding technique or welding material that provides sufficient strength to the remanufactured fluid end block 128 may be used to couple the replacement segment 130 with the first adjacent segment 138, without limiting the scope of the present disclosure.

Figure 6:
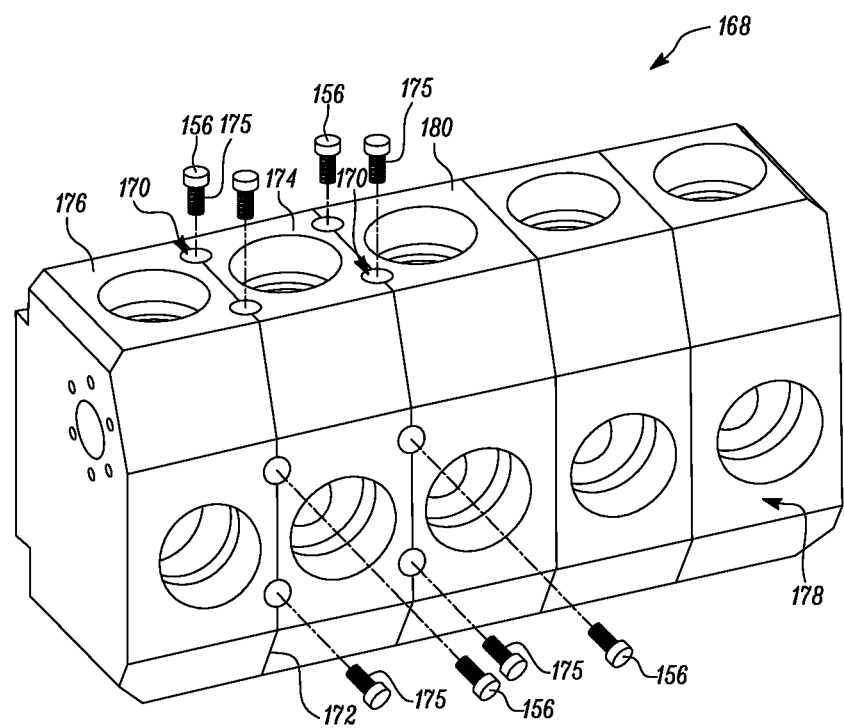
FIG. 6 is a perspective view of a remanufactured fluid end block formed by stitch pins, according to another embodiment of the present disclosure.

FIG. 6 illustrates another embodiment of the present disclosure in which a remanufactured fluid end block 168 is formed by the stitch pins 156. More particularly, a replacement segment 174 is coupled with a first adjacent segment 176 using the stitch pins 156. It should be noted that design of the replacement segment 174 and the first adjacent segment 176 is similar to design of the replacement segment 130 and the first adjacent segment 138 shown in FIGS. 3 to 5. The stitch pins 156 draws the replacement segment 174 and the first adjacent segment 176 close to establish a pressure tight joint. The stitch pins 156 include a threaded portion 175 having reverse threads. The stitch pins 156 may be made from any one of stainless steel and cast iron, or any other material, and may have a substantially uniform diameter. Further, a number of apertures 170 are provided at a contact portion 172 of the replacement segment 174 and the first adjacent segment 176. The stitch pins 156 may be press fit within the apertures 170. The apertures 170 are embodied as blind holes that receive the stitch pins 156. A drilling operation or a boring operation may be performed at the contact portion 172 to provide the number of apertures 170.

In the illustrated embodiment, nine apertures 170 are provided at the contact portion 172. However, a total number of the apertures 170 may vary without any limitations based on dimensions of the pump assembly 100 and required strength of joint between the replacement segment 174 and the first adjacent segment 176.

Figure 7:
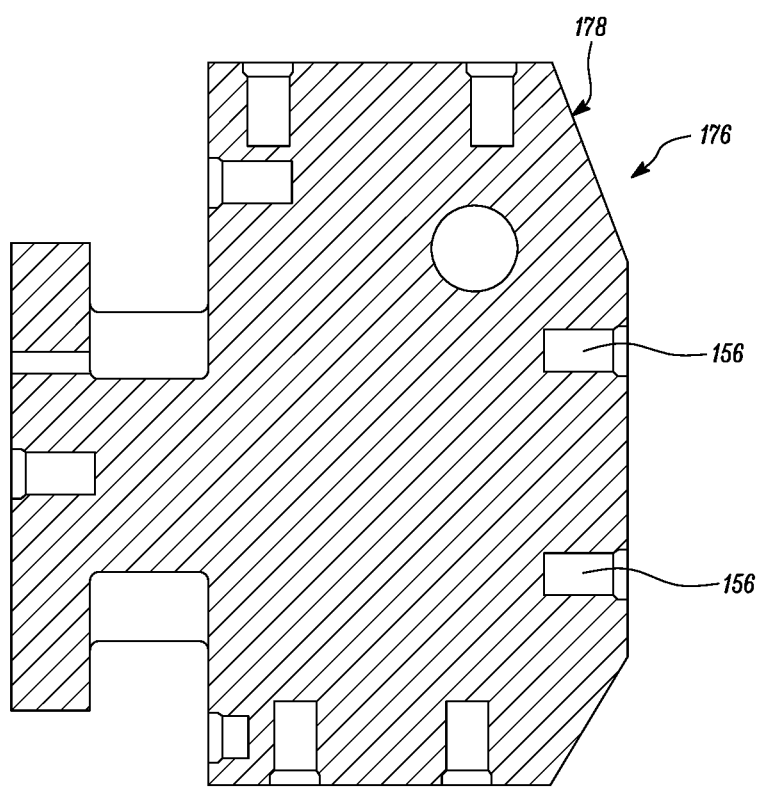
FIG. 7 is a cross-sectional view of the replacement segment of the remanufactured fluid end block of FIG. 6.

A cross-sectional view of the replacement segment 174 of the remanufactured fluid end block 168 is shown in FIG. 7. The cross-sectional view illustrates locations of the stitch pins 156 installed at the contact portion 172 of the replacement segment 174 and the first adjacent segment 176. Further, after installation of the stitch pins 156, an outer surface 178 of the remanufactured fluid end block 168 is machined to remove any excess material of the stitch pins 156 that projects from the outer surface 178 of the remanufactured fluid end block 168. The excess material can be machined using any known machining process including, but not limited to, milling and grinding. It should be noted that the details of the coupling between the replacement segment 174 and the first adjacent segment 176 provided above is equally applicable to a coupling of the replacement segment 174 with a second adjacent segment 180, without any limitations.

INDUSTRIAL APPLICABILITY

The present disclosure relates to a method 800 of remanufacturing the fluid end block 108 and the remanufactured fluid end block 128, 168. The remanufactured fluid end block 128, 168 includes the replacement segment 130, 174 that replaces the damaged segment 124. The replacement segment 130, 174 is coupled with one or more adjacent segments of the fluid end block 108. The method 800 of the present disclosure is cost effective and simple. The method 800 eliminates requirement of replacement of the entire fluid end block 108 when one or more segments 110 of the fluid end block 108 are subjected to damage.

In one embodiment, the replacement segment 174 is coupled to the first and second adjacent segments 176, 180 using stitch pins 156. The stitch pins 156 draw the replacement segment 174 and the first adjacent segment 176 close to form the pressure tight joint. In another embodiment, the replacement segment 130 is coupled to the first and second adjacent segments 138, 140 by welding. The coupling techniques discussed above prevent leakage of the working fluid in the remanufactured fluid end block 128, 168.

Figure 8:
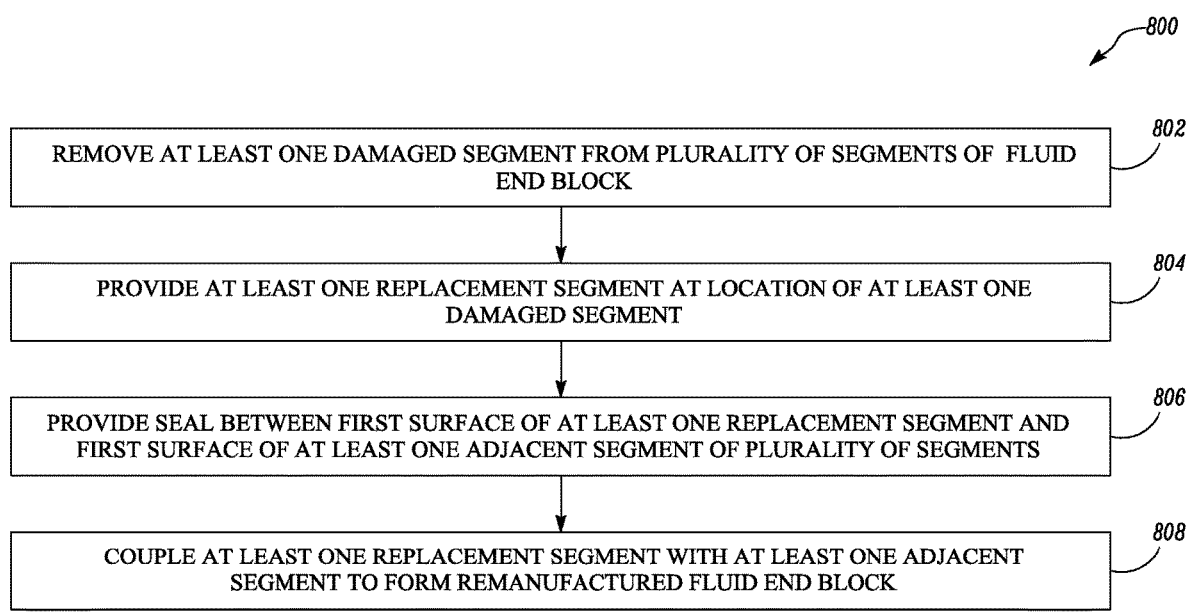
FIG. 8 is a flowchart for a method of remanufacturing the fluid end block.

FIG. 8 is a flowchart for the method 800 of remanufacturing the fluid end block 108. The fluid end block 108 includes the number of segments 110 that receives the working fluid. For exemplary purposes, the method 800 will now be explained in relation to the coupling of the replacement segment 130, 174 with the first adjacent segment 138, 176. However, it should be noted that the details provided below are equally applicable to the coupling of the replacement segment 130, 174 with any adjacent segment of the fluid end block 108, without any limitations.

At step 802, the damaged segment 124 is removed from the number of segments 110 of the fluid end block 108. The damaged segment 124 may be removed by any of the metal cutting methods known in the art. Further, the first surface 148 of the first adjacent segment 138, 176 is machined upon removing the damaged segment 124.

At step 804, the replacement segment 130, 174 is provided at the location of the damaged segment 124. The replacement segment 130, 174 replaces the damaged segment 124. In one example, the material of the replacement segment 130, 174 is same as the material of the damaged segment 124 and the number of segments 110 of the fluid end block 108. In another example, the material of the replacement segment 130, 174 may be different from the material of the damaged segment 124 and the number of segments 110 of the fluid end block 108.

At step 806, the seal 152 is provided between the first surface 144 of the replacement segment 130 and the first surface 148 of the first adjacent segment 138. Further, the circular groove 154 is formed on the first surface 144 of the replacement segment 130, 174 to receive the seal 152. The seal 152 is embodied as the metal seal. It should be noted that a similar seal (not shown is provided between the replacement segment 174 and the first adjacent segment 176.

At step 808, the replacement segment 130, 174 is coupled with the first adjacent segment 138, 176 to form the remanufactured fluid end block 128, 168. The replacement segment 130, 174 is coupled with the first adjacent segment 138, 176 by welding and the stitch pins 156, respectively. The coupling of the replacement segment 130 with the first adjacent segment 138 by welding includes machining the first surface 144 of the replacement segment 130 to provide the first chamfered edge 158. Also, the first surface 144 of the first adjacent segment 138 is machined to provide the second chamfered edge 160. Further, the weld bead 164 is provided in the channel 162 formed by the first and second chamfered edges 158, 160 for coupling the replacement segment 130 with the first adjacent segment 138 by welding.

Further, the coupling of the replacement segment 174 with the first adjacent segment 176 by the stitch pins 156 includes providing the number of apertures 170 at the contact portion 172 of the replacement segment 174 and the first adjacent segment 176 for receiving the stitch pins 156. Further, the excess material of the stitch pins 156 projecting outwards from the outer surface 178 of the remanufactured fluid end block 168 is removed by machining.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of remanufacturing a fluid end block, the fluid end block including a plurality of segments adapted to receive working fluid, the method comprising:
    removing at least one damaged segment from the plurality of segments of the fluid end block;
    providing at least one replacement segment at a location of the at least one damaged segment;
    providing a seal between a first surface of the at least one replacement segment and a first surface of at least one adjacent segment of the plurality of segments; and
    coupling the at least one replacement segment with the at least one adjacent segment to form a remanufactured fluid end block;
    wherein the at least one replacement segment is coupled with the at least one adjacent segment by welding;
    wherein the coupling of the at least one replacement segment with the at least one adjacent segment by welding comprises:
        machining the first surface of the at least one replacement segment to provide a first chamfered edge at the first surface;
        machining the first surface of the at least one adjacent segment to provide a second chamfered edge at the first surface; and
        providing a weld bead in a channel formed by the first and second chamfered edges.

2. The method of claim 1 further comprising machining the first surface of the at least one adjacent segment before the coupling of the at least one replacement segment with the at least one adjacent segment.

3. The method of claim 1, wherein the at least one replacement segment includes a circular groove formed on the first surface of the at least one replacement segment, wherein the circular groove is adapted to receive the seal.

4. The method of claim 1, wherein the seal is a metal seal.

5. A method of remanufacturing a fluid end block, the fluid end block including a plurality of segments adapted to receive working fluid, the method comprising:
    removing at least one damaged segment from the plurality of segments of the fluid end block;
    providing at least one replacement segment at a location of the at least one damaged segment;
    providing a seal between a first surface of the at least one replacement segment and a first surface of at least one adjacent segment of the plurality of segments; and
    coupling the at least one replacement segment with the at least one adjacent segment to form a remanufactured fluid end block;
    wherein the at least one replacement segment is coupled with the at least one adjacent segment by stich pins;
    wherein the coupling of the at least one replacement segment with the at least one adjacent segment by the stitch pins comprises:
    providing a plurality of apertures at a contact portion of the at least one replacement segment and the at least one adjacent segment for receiving the stitch pins;
    installing the stitch pins in the plurality of apertures; and
    machining an excess material of the stitch pins projecting outwards from an outer surface of the remanufactured fluid end block.

* * * * *